T. G. & L. L. CORDI.
ENGRAVING MACHINE.
APPLICATION FILED DEC. 3, 1910.

1,036,526.

Patented Aug. 20, 1912.
5 SHEETS—SHEET 3.

Witnesses
Frank B. Hoffman
U. B. Hillyard

Inventors
Thomas George Cordi,
Leander Lee Cordi.

By Victor J. Evans
Attorney

T. G. & L. L. CORDI.
ENGRAVING MACHINE.
APPLICATION FILED DEC. 3, 1910.

1,036,526.

Patented Aug. 20, 1912.
5 SHEETS—SHEET 4.

Witnesses
Frank B. Hoffman
U. B. Hillyard

Inventors
Thomas George Cordi,
Leander Lee Cordi.
By Victor J. Evans
Attorney

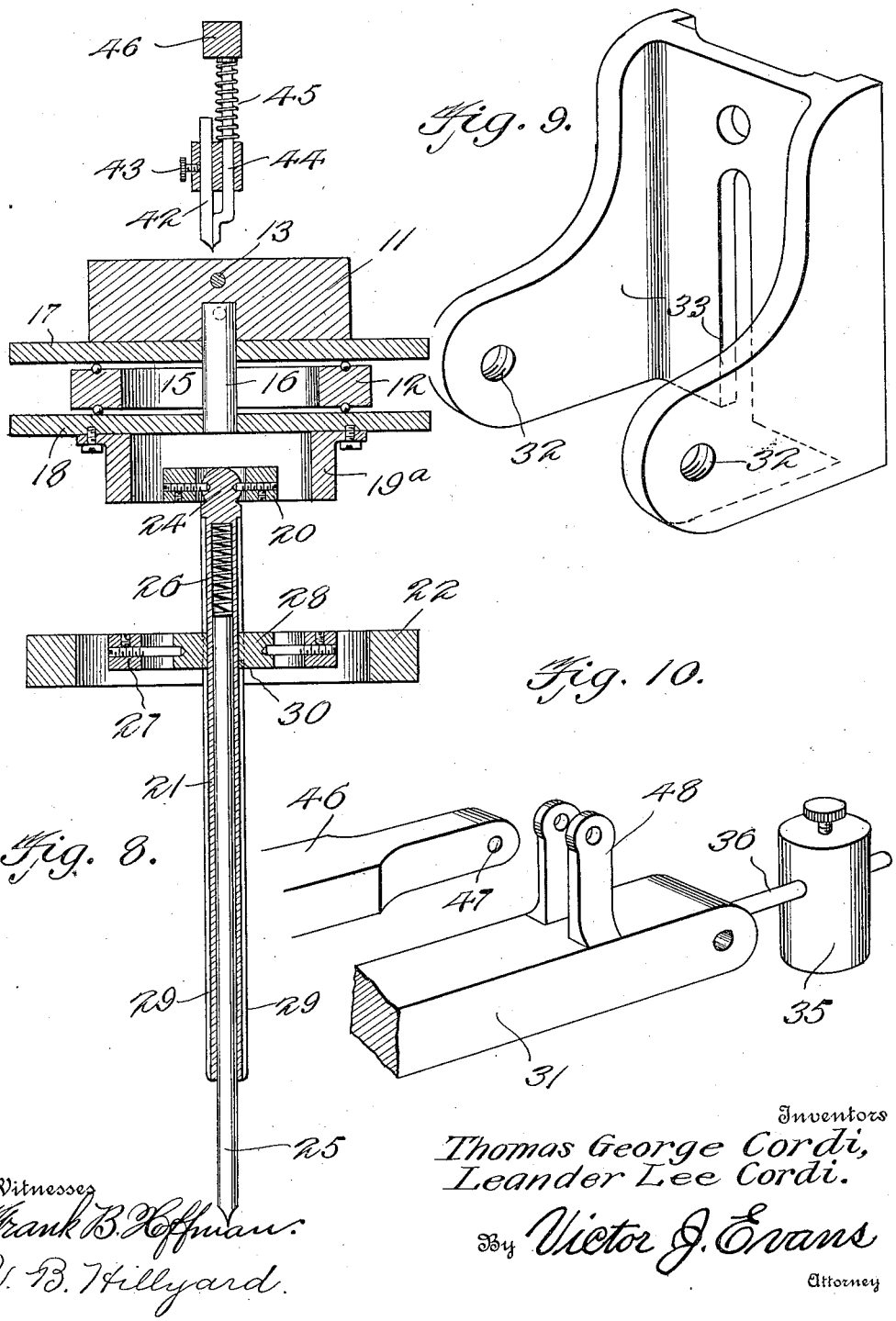

UNITED STATES PATENT OFFICE.

THOMAS GEORGE CORDI AND LEANDER LEE CORDI, OF ROSEVILLE, CALIFORNIA.

ENGRAVING-MACHINE.

1,036,526.  Specification of Letters Patent.  Patented Aug. 20, 1912.

Application filed December 3, 1910. Serial No. 595,465.

*To all whom it may concern:*

Be it known that we, THOMAS G. CORDI and LEANDER L. CORDI, citizens of the United States, residing at Roseville, in the county of Placer and State of California, have invented new and useful Improvements in Engraving-Machines, of which the following is a specification.

The primary object of this invention is the provision of a machine of novel structure admitting of the reproduction of a pattern or other matter inscribed or otherwise imprinted upon a surface, such machine having for its primal intent to engrave a surface and reproduce thereon a design which is traced by means of a pointer, the machine being of such formation as to admit of varying the proportions between the pattern and the work and also to admit of accuracy in following the outline and producing shading in the engraving or tracing wherever rendered necessary.

The invention contemplates a machine embodying an adjustable fulcrum support for the tracing rod or element, whereby the size of the engraving or reproduction of the pattern may be regulated to meet the desired requirement, hence the work may be enlarged or made smaller to meet varying demands.

The invention consists of the novel features, details of construction and combination of parts, which hereinafter will be more particularly set forth, illustrated in the accompanying drawings, and pointed out in the appended claims.

Figure 1:
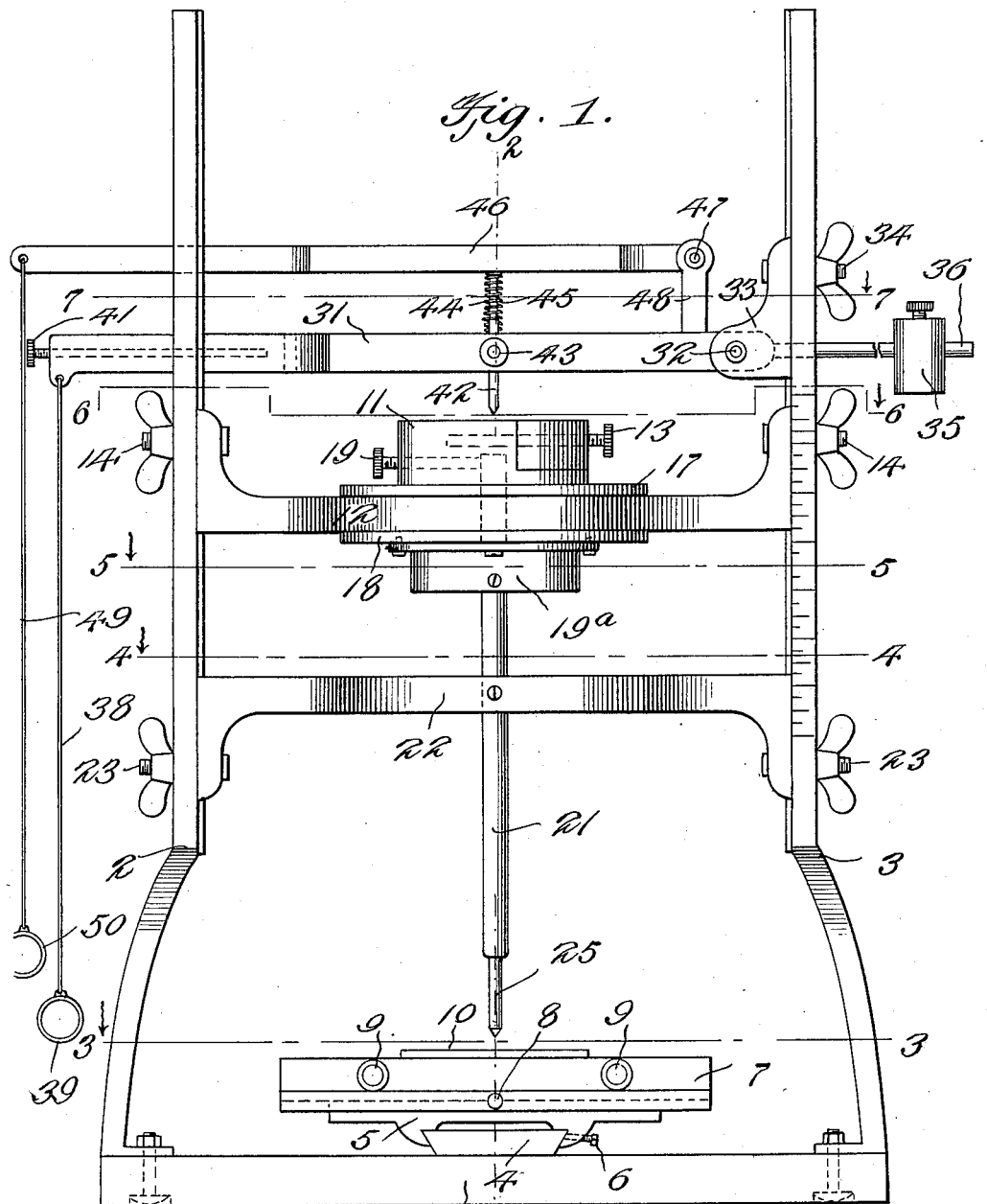
Figure 2:
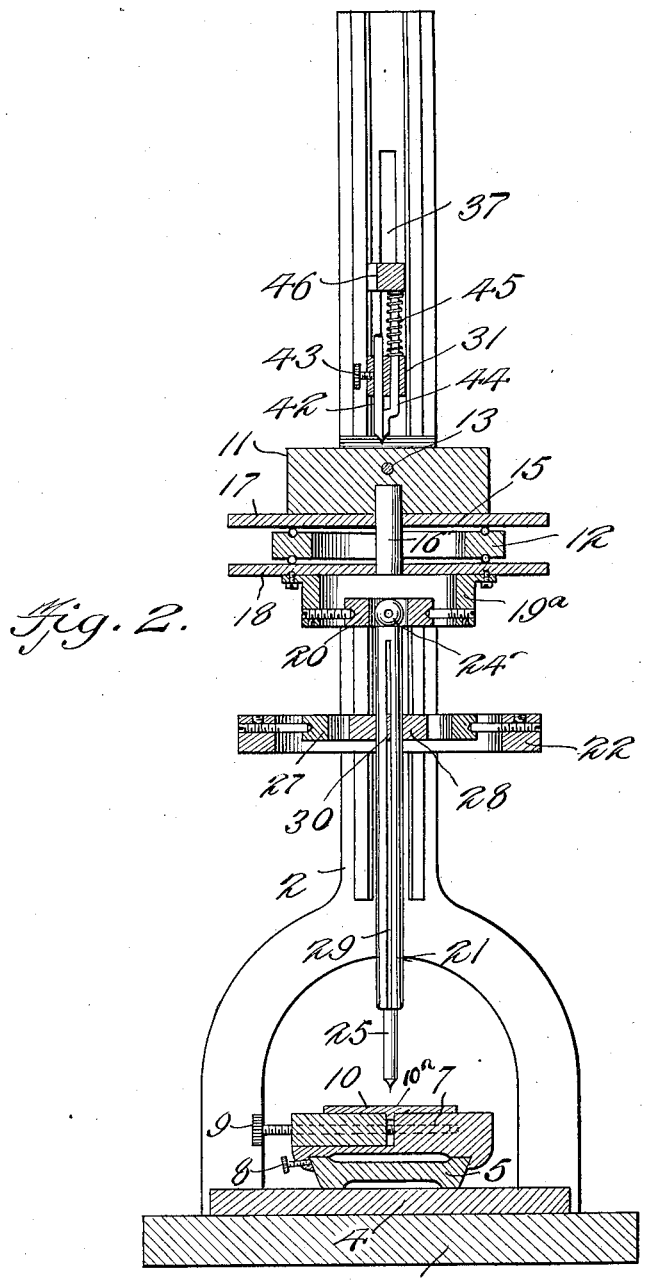
Figure 3:
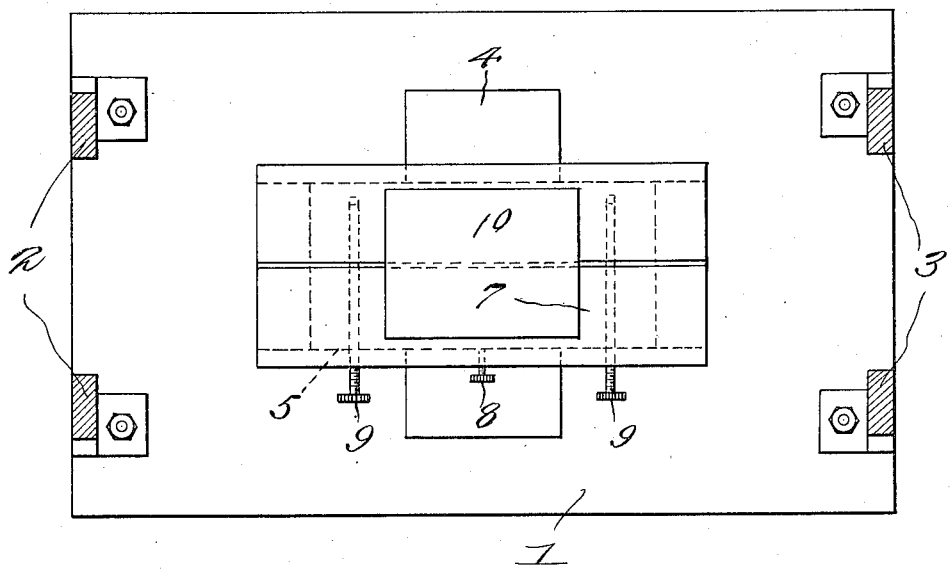
Figure 4:
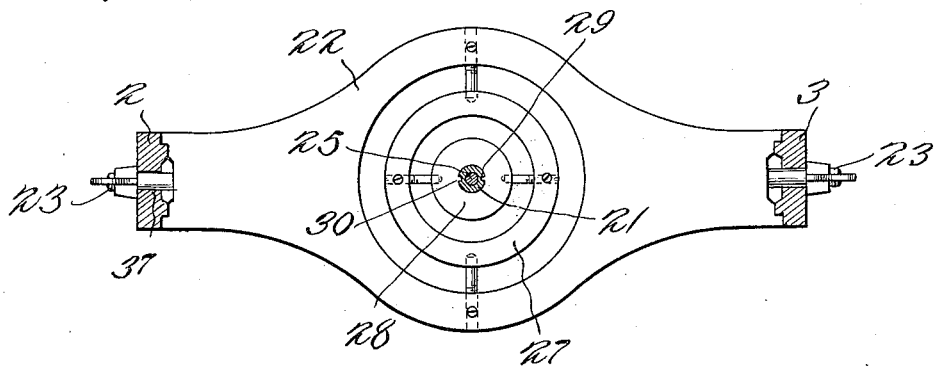
Figure 5:
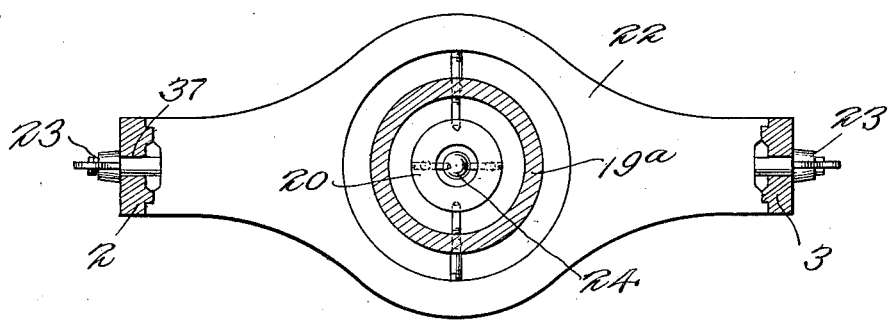
Figure 6:
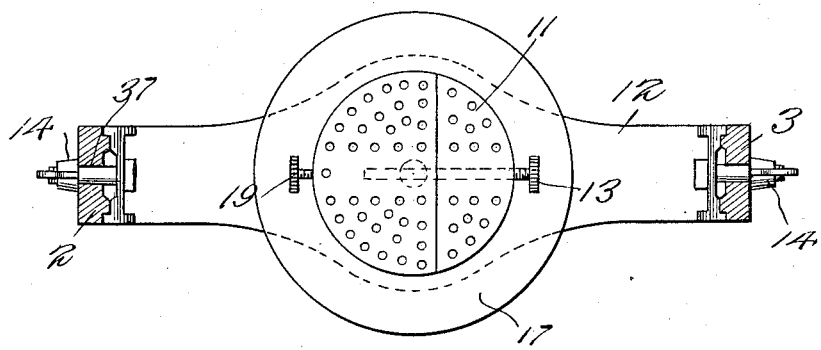
Figure 7:
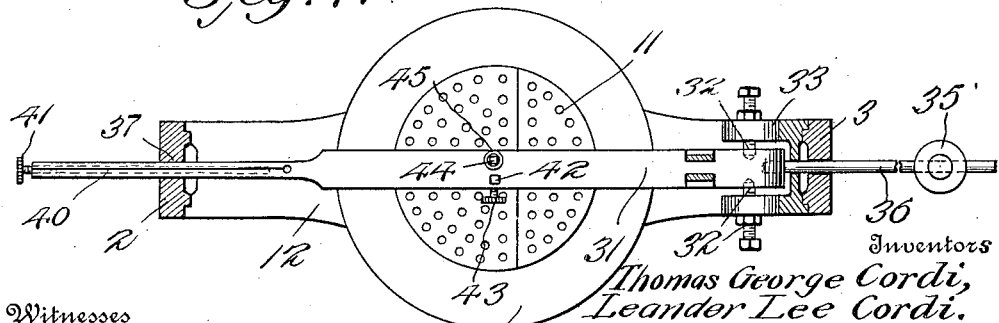

Referring to the drawings, forming a part of the application, Figure 1 is a front view of a machine embodying the invention. Fig. 2 is a vertical section on the line 2—2 of Fig. 1. Fig. 3 is a horizontal section on the line 3—3 of Fig. 1. Fig. 4 is a horizontal section on the line 4—4 of Fig. 1. Fig. 5 is a horizontal section on the line 5—5 of Fig. 1. Fig. 6 is a horizontal section on the line 6—6 of Fig. 1. Fig. 7 is a horizontal section on the line 7—7 of Fig. 1. Fig. 8 is a vertical section on the line 2—2 of Fig. 1, showing the parts on a larger scale, the supporting frame being omitted. Fig. 9 is a perspective view of the bracket to which the tool carrier is pivoted. Fig. 10 is a detail perspective view of the pivot end of the tool carrier and the inner end of the pressure bar, the parts being separated.

Corresponding and like parts are referred to in the following description, and indicated in all the views of the drawings, by the same reference characters.

A framework for supporting the working parts comprises a base 1 and similar uprights 2 and 3. A guide 4 is located upon the base 1 and extends transversely thereof and supports a second guide 5 which is adjustable on the guide 4 and adapted to be secured in the located position by means of a set screw 6. A pattern holder 7 is mounted upon the guide and is adjustable longitudinally upon the guide and is secured in the adjusted position by one or more set screws 8. The pattern holder is formed of two parts, which are brought together by means of one or more set screws 9. The pattern is provided upon a plate 10, which may be secured upon the pattern holder 7 in any manner. As shown the plate 10 has a projecting portion 10$^a$ which is clamped between the parts of the pattern holder. A pattern may be provided upon the plate 10 or like part in any manner and may consist of a letter, a word, symbol, character or design. After the pattern holder is properly adjusted upon the base 1 it remains fixed.

A work holder 11 is mounted upon a support 12, which consists of a bar or cross piece adjustably supported between the uprights 2 and 3. The work holder may be of any formation and usually comprises sections which are connected by means of a set screw 13 so as to clamp the work. The support 12 is secured to the uprights 2 and 3 in any manner, preferably by means of bolts 14. By having the support 12 adjustable vertically the distance between the upper surface of the work holder and the graver or cutting tool may be regulated according to the thickness of the work. The support 12 has a centrally disposed opening 15 through which passes a stem 16 or like connection joining the work holder and carrier to admit of the work holder moving freely in all directions so that it may follow the movements of the tracing point.

The carrier consists of an upper member 17 and a lower member 18, said members being arranged relatively above and below the support 12 and connected by means of the stem 16 which enters the work holder and is retained in place by means of a set screw or like fastening 19. To reduce the friction to the smallest amount possible between the carrier and the support 12 balls are interposed between adjacent surfaces of the parts, thereby admitting of the work holder moving with the greatest freedom in all directions. A ring 19ª is pendent from the carrier, being secured to the member 18 and supports a second ring 20, the two rings 19ª and 20 being connected to form in effect a gimbal.

A tracing rod 21 is pivotally supported by means of a fulcrum bar or cross piece 22, which is vertically adjustable between the uprights 2 and 3 and secured to the latter in the located position by means of bolts or other suitable fastenings 23. The tracing rod 21 has a ball 24 at its upper end which snugly fits within the ring 20. A tracing point 25 is movable within the tracing rod 21, the latter having an opening in which the tracing point is fitted. A coil spring 26 located within the upper end of the opening formed in the tracing rod 21 exerts a pressure upon the tracing point 25 to hold it in close contact with the pattern at all angular positions of the tracing rod. The tracing rod 21 is connected with the bar or cross piece 22 so as to oscillate freely in every direction, thereby admitting of the tracing point 25 following every outline of the pattern. The fulcrum bar or cross piece 22 has a central opening in which is located a gimbal joint comprising an outer ring 27 and an inner ring 28. The pivot supports of the two rings 27 and 28 are located relatively at a right angle. The tracing rod 21 fits snugly within the ring 28 and is prevented from turning therein, said tracing rod having vertical grooves 29 in opposite sides to receive opposite projections 30 extending into the opening of the ring 28. When the fulcrum bar or cross piece 22 is adjusted to occupy a position midway between the pattern holder and the work holder the tracing or engraving is of a size equal to the size of the pattern. When the fulcrum bar is adjusted to a point above the medial plane the engraving or tracing is reduced in size and adjustment of the fulcrum bar to a point below the medial plane results in proportionate enlargement of the engraving or tracing.

The tool holder 31 is movable and consists of a lever which is fulcrumed at 32 upon a bracket 33, which is adjustable upon the upright 3, being secured in the desired position by means of a bolt or fastening 34 which extends through a slot formed in the upright 3. The tool holder is counterbalanced by means of a weight 35 adjustable upon an arm 36 extending outwardly from the pivot end of the tool holder. The end of the tool holder remote from the pivot support 32 passes through a slot 37 formed vertically in the upright 2 and has a cord or like connection 38 attached thereto, said connection having a button 39 at its lower end to be engaged by the hand of the operator so as to depress the outer end of the tool holder and bring the tool into engagement with the work. It is highly important that the tool holder 31 have freedom of movement vertically yet be prevented from having lateral play. To accomplish this result the tool holder is counterbalanced and the pivot supports 32 are adjustable and provision is had for compensating for wear between the outer end of the tool holder and the sides of the slide 37. The outer portion of the tool holder is split for a distance from its extremity and has a threaded opening 40 in which is fitted a screw 41, whereby the split portions may be spread more or less to insure a close fit between them and the vertical walls of the slot 37 to prevent lateral play and avoid binding. The counterbalancing weight 35 is adjusted on the arm 36 so as normally to elevate the outer end of the tool holder and lift the tool from the work.

The cutting tool 42 consists of a fine line graver, which is secured in an opening formed vertically in the tool holder 31 and which is secured in the located position by means of a set screw 43. It is to be understood that the cutting tool may be of any formation according to the nature of the engraving. In the event of the pattern to be traced simply the cutting tool is replaced by means of a stylus of any variety so as to trace the design or pattern upon the surface to be marked or laid off.

A shading tool 44 is loosely mounted in the tool holder 31, being fitted in a vertical opening thereof. A helical spring 45 is mounted upon the upper portion of the shading tool and is confined between the tool holder and a stop near the upper end of the shading tool and normally exerts an upward pressure upon the shading tool to hold the same out of action. When it is required to produce a thickened line to conform to shading upon the outline of any portion of the pattern the shading tool is depressed by means of a pressure bar 46, which consists of a lever pivoted at 47 to a standard 48 projected vertically from the inner end of the tool holder 31. The pressure bar 46 consists of a lever which has its outer end extending through the slot 37 of the upright 2, a cord or connection 49 being attached thereto and having a button 50 at its lower end to be engaged by the hand and pressed upon when it is required to bring the shading tool 44 into active operation.

The design, symbol, or other matter constituting the pattern to be engraved, traced or reproduced is placed upon the holder 7 and the object to receive the engraving, tracing or reproduction is secured upon the work holder 11, after which the pattern holder 7 is adjusted upon the base 1 to bring the tracing point 25 at an approximately central position. The work holder support 12 is adjusted vertically to accommodate the surface of the work to the extremity of the tool or part 42. If the reproduction or engraving is to be the same size as the pattern the fulcrum bar 22 is adjusted to a medial point, that is so as to occupy a plane intermediate of planes passing through the work and pattern. If the reproduction is to be reduced the fulcrum bar 22 is elevated above the medial plane, but if the reproduction is to be enlarged the fulcrum bar is moved below the medial plane. The work is effected by moving the tracing point over the outline of the pattern, thereby oscillating the tracing rod and moving the work holder beneath the tool 42, the latter being brought into contact with the surface to receive the reproduction by pressing downward upon the knob 39. Upon releasing the knob 39 the tool is elevated by means of the weight 35. When it is required to thicken the outline the knob 50 is pressed upon, thereby depressing the pressure bar 46 to bring the shading tool 44 into active operation. Both tools 42 and 44 are caused to operate simultaneously by depressing the parts 39 and 50.

From the foregoing description, taken in connection with the accompanying drawings, the advantages of the construction and of the method of operation will be readily apparent to those skilled in the art to which the invention appertains, and while we have described the principle of operation of the invention, together with the device which we now consider to be the embodiment thereof, we desire to have it understood that the device shown is merely illustrative, and that such changes may be made when desired as are within the scope of the claims appended hereto.

Having thus described the invention what is claimed as new, is:—

1. In an engraving or reproducing machine, the combination of a work holder, a movable tool holder, a slotted guide for directing the tool holder in its movements, and means for relatively adjusting the tool holder and slot of the guide to take up play and prevent any lost movement.

2. In a machine of the character set forth, the combination of a work holder, a tool holder movable toward and away from the work holder and comprising a split portion, a slotted guide for receiving the split portion of the tool holder, and means for spreading the split portions of the tool holder to insure a close fit between the tool holder and the slotted portion of the guide.

3. In an engraving or reproducing machine, the combination of a work holder, a pivoted tool holder having an end portion longitudinally split, adjustable pivot supports for the opposite end of the tool holder, an arm projecting from the pivot end of the tool holder, a counterbalancing weight adjustably mounted upon said arm, a slotted guide for receiving the split end of the tool holder, and means for spreading the split portions of the tool holder to insure the formation of a close joint between them and the slotted guide.

4. In an engraving or reproducing machine, the combination of a work holder, a tool holder, a cutting tool mounted upon the tool holder for reproducing the pattern in outline, and a shading tool loosely mounted upon the tool holder and adapted to be brought into operative position when it is required to thicken or widen the outline.

5. In a machine of the nature specified, the combination of a work holder, a tool holder, an outlining tool carried by said tool holder, a shading tool loosely mounted upon the tool holder, and means under control of the operator for bringing the shading tool into operative position when required.

6. In a machine of the character set forth, the combination of a work holder, a tool holder, an outlining tool mounted upon the tool holder, a shading tool loosely mounted upon the tool holder, means normally exerting a pressure upon the shading tool for holding the same out of action, and a pressure bar for throwing the shading tool into active position.

7. In a machine of the nature set forth and in combination with the work holder, a movable tool holder, an outlining tool mounted upon the tool holder, a shading tool loosely mounted upon the tool holder, and a bar pivotally mounted upon the tool holder and adapted to project the shading tool into operative position.

8. In combination a work holder, a pivoted tool holder, an outlining tool mounted thereon, a shading tool loosely mounted upon the tool holder, means normally exerting a pressure to hold the shading tool out of action, and a bar pivotally mounted upon the tool holder and adapted to project the shading tool into operative position.

9. In combination a work holder, a pivoted tool holder, means for counterbalancing the tool holder to normally hold the same away from the work holder, an outlining tool mounted upon the tool holder, a shading tool loosely mounted upon the tool holder, means normally holding the shading tool out of action, a bar pivotally mounted upon the tool holder and adapted to bring the shading tool into active position, means for moving the tool holder toward the work holder, and other means for independently moving the pivoted bar for advancing the shading tool toward the work holder.

10. In a machine of the character set forth, the combination of a work holder mounted to move in all directions, a tracing rod having connection with the work holder by means of a gimbal or universal joint, a fulcrum bar forming a support for the tracing rod, and inner and outer rings constituting a gimbal joint between the fulcrum bar and the tracing rod, the inner ring having a projection extending into its opening and the tracing rod having a longitudinal groove in a side to receive the inner projection of the last mentioned inner ring.

In testimony whereof we affix our signatures in presence of two witnesses.

THOMAS GEORGE CORDI.
LEANDER LEE CORDI.

Witnesses:
HENRY FLINDT,
F. E. COLLEY.

Copies of this patent may be obtained for five cents each, by addressing the "Commissioner of Patents. Washington, D. C."